United States Patent [19]
Fuziwara et al.

[11] 4,272,062
[45] Jun. 9, 1981

[54] BLAST FURNACE HEARTH

[75] Inventors: Shigeru Fuziwara; Shinichi Tamura, both of Himeji, Japan

[73] Assignee: Nippon Steel Corporation, Tokyo, Japan

[21] Appl. No.: 99,025

[22] Filed: Nov. 30, 1979

[30] Foreign Application Priority Data

Dec. 18, 1978 [JP] Japan .............................. 53-155961

[51] Int. Cl.³ ............................................ F27B 14/00
[52] U.S. Cl. ...................................... 266/284; 75/95; 106/56; 264/30
[58] Field of Search .................. 75/95; 266/280–286; 106/56; 264/30

[56] References Cited

U.S. PATENT DOCUMENTS 3,923,531  12/1975  Parsons et al. ....................... 106/56

Primary Examiner—M. J. Andrews
Attorney, Agent, or Firm—Wenderoth, Lind & Ponack

[57] ABSTRACT

A blast furnace hearth, or at least its internal surface layer, is built of carbon bricks whose pores have been reduced in size by an Si—N—O composition formed in them.

4 Claims, 2 Drawing Figures

BLAST FURNACE HEARTH

BACKGROUND OF THE INVENTION

This invention relates to a blast furnace hearth lined with refractory bricks.

In the lower portion of a blast furnace where the molten metal collects, especially in the portion below the iron notch, the surface of the lining refractory layer is in contact with the molten metal at a temperature of 1400° C. to 1600° C.

The refractory layer consists of refractory bricks and is protected by external cooling. The recent increase in blast furnace volume has led to use of larger bricks and severer operating conditions involving, for example, high-pressure operation and high-rate tapping. This tendency has resulted in increased thermal wearing of the carbon bricks. Main causes for this increased thermal wearing are:

(1) The dissolution of carbonizing material from the carbon bricks into the molten iron; and (2) The infiltration of molten iron into the carbon brick pores.

The dissolution of carbonizing material can be prevented by using a carbonizing material having low solubility or a carbonizing material having a dissolution inhibitor added thereto, as has already been carried out in various ways.

To prevent the infiltration of molten iron, it is essential to reduce the size of the carbon brick pores.

It has been estimated that molten iron can infiltrate even into small pores approximately 5 μm in diameter. It has also been confirmed by the dissection of blown out blast furnaces that the infiltration occurs in pores as fine as approximately 1 μm.

Obviously, the smaller the pore size, the less will be the molten iron infiltration. Reduction of the pore size to below 5 μm substantially eliminates iron infiltration and prolongs the brick life greatly.

Large carbon bricks manufactured by conventional ordinary processes contain many pores approximately 10 μm in diameter. These bricks are highly susceptible to iron infiltration.

A basic known method for reducing the carbon brick pore size is to produce the bricks from materials mixed at a specific grain size distribution wherein, in particular, the ratio of fine-grained particles is increased.

The increase in the ratio of fine-grained particles according to method, however, calls for increased addition of tar or other binder and this results in the formation of more pores. The increase in amount of added binder causes greater contraction on burning, which produces many cracks in the product bricks. Besides, the pore size cannot be made smaller than approximately 5 μm.

For these reasons, large carbon bricks with fine pores have been difficult to obtain.

SUMMARY OF THE INVENTION

This invention aims at solving the aforementioned problems inherent in conventional blast furnace hearths. An object of this invention is to provide a durable blast furnace hearth which suffers little wearing from its exposure to molten iron.

In order to achieve the above object, a blast furnace hearth of this invention is built of, at least in the internal surface layer thereof, carbon bricks whose pores have been reduced in size by forming an Si—N—O composition therein.

Because of this characteristic, the blast furnace hearth of this invention permits very little molten iron to infiltrate into the brick pores, thereby sharply reducing the thermal wearing of bricks due to molten iron. Also the formation of SiC in the brick structure increases the stability of bricks against molten iron. These improvements remarkably enhance the durability of the blast furnace hearth.

DETAILED DESCRIPTION OF THE PREFERRED EMBODIMENTS

Figure 1:
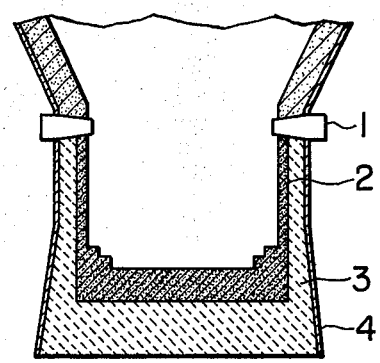
FIG. 1 is a cross-sectional view exemplifying a blast furnace hearth according to this invention.

Having become aware of the limits on reducing carbon brick pores by filling with fine-grained particles, the inventors sought other methods for achieving the same object. Among the atternative methods they considered, they found that especially good results are obtained by adding metallic silicon in carrying out a process for forming a bond-structure by a chemical reaction between metal and carbon particles, the former being dispersed among the latter. The carbon bricks thus obtained have proved to be very well suited for the construction of blast furnace hearths. This invention is based on this discovery.

A concrete description of this invention is given in the following.

When carbon brick material of selected grain size, especially such a material containing a high percentage of fine-grained particles, is formed and burned, part of the continuous and discontinuous openings (pores), unavoidably formed between the particles, can be reduced to approximately 5 μm in diameter. As this method given rise to other problems, however, it is not fully satisfactory.

This invention reduces the size of the carbon brick pores by forming an Si—N—O composition in them. This carbon brick is prepared by first mixing 0.5 to 15 parts of fine-grained metallic silicon of a grain size not larger than 100 μm, and 15 to 25 parts of carbon binder with 75 to 85 parts of carbon material of controlled grain size. The mixture is heated and kneaded at a temperature between 110° C. and 170° C. to disperse the metallic silicon particles among the carbon particles. The kneaded mixture is press-formed into bricks. The formed products are buried in coke breeze through which heated air is passed, where they are burned at a temperature of 1150° C. to 1500° C. for about two hundred hours. Table 1 shows an example of the grain size distribution in the above-described carbon material.

TABLE 1

| Carbon Material | |
|---|---|
| Grain Size (mm) | Ratio (%) |
| 10-5 | 20 |
| 5-1 | 30 |
| 1-0.074 | 25 |
| Under 0.074 | 25 |

In the above burning process, the metallic silicon particles dispersed among the carbon particles react with an atmospheric gas consisting mainly of CO, whereby most of the metallic silicon combines with the carbon in the brick to form stable silicon carbide. The metallic silicon particles exposed in the pores combine with the oxygen and nitrogen in them to form an Si—N—O composition (consisting mainly of fibrous $Si_2ON_2$ crystals). More specifically, part of the exposed metallic silicon combines with the oxygen in the pores to form $SiO_2$, which, in turn, combines with other silicon to generate SiO gas as expressed below.

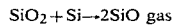
$$SiO_2 + Si \rightarrow 2SiO \text{ gas}$$

This SiO gas, together with nitrogen, combines with the silicon dissolved out in the pores to form $Si_2ON_2$ as shown below.

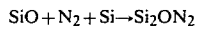
$$SiO + N_2 + Si \rightarrow Si_2ON_2$$

The resultant $Si_2ON_2$ is fibrous in shape, and fine-grained. A small quantity of fine-grained, preferably extremely fine-grained, metallic silicon dispersed in the carbon brick provides a large number of nuclei for forming the Si—N—O composition. The resultant fibrous Si—N—O composition is thought to reduce the brick pore size, dividing or fractionizing the continuous openings and filling part of the discontinuous openings.

The pore diameter of the carbon brick thus obtained proves to be not larger than 5 μm, with the pore size distribution moving to the smaller side. The volumetric ratio of the undesirable pores not smaller than 1 μm to the total pores decreases sharply, with the pore size throughout averaging not larger than 1 μm. This is due to the formation of fibrous $Si_2ON_2$ crystals resulting from the combination of nitrogen, oxygen and silicon inside the pores. These crystals fractionize each pore to reduce its apparent size.

Permeability drops sharply to one-fiftieth to one-hundredth of the conventional level. This is due to the above-described apparent fractionization of pores by the fibrous $Si_2ON_2$ crystals, which results in a decrease is pores not smaller than 1 μm and the elimination of pore continuity.

During burning, part of the metallic silicon particles added forms silicon carbide having a greater bonding strength than the bonding strength caused by the carbonization of the binder. This silicon carbide inhibits the occurrence of cracks due to contraction under burning heat.

Large carbon bricks with pores mostly not larger than 5 μm and few cracks withstand the action of molten iron favorably.

This favorable property can be explained by the reduction of pore size which, in turn, decreases the infiltration of molten iron into the pores and the dissolution of brick material into the molten metal. Further, the formation of SiC in the brick structure increases the stability against molten iron.

As mentioned previously, the blast furnace hearth is in constant contact under pressure with molten iron at a temperature of 1400° C. to 1600° C. Obviously, the brick joint is a weak point in the hearth; the fewer joints, the better. Accordingly, the blast furnace hearth of this invention is built of large carbon bricks measuring 500–600 mm by 600–700 mm in cross section, with a length of 800–2800 mm.

At least the internal surface layer 2 of the blast furnace hearth below the tuyeres 1 is built of said carbon bricks with pores of reduced size, as shown in FIG. 1.

The thickness of the internal surface layer 2 varies with the total thickness of the refractory layer 3 constituting the hearth and the external cooling capacity. But it should at least cover the area in which the temperature remains as high as between 1000° C. and 600° C., or which corresponds to one-third to one-half of the total refractory layer thickness. Reference numeral 4 designates a steel shell.

With the exception of the internal surface layer 2, the refractory layer 3 may be built of ordinary carbon bricks.

An example of this invention will now be set forth.

Sixty-three percent of calcined anthractite coal, sized for the preparation of large carbon bricks, 16 percent of natural graphite and 21 percent of coal tar pitch, having a softening point of 80° C., were kneaded at a temperature of 140° C. to 150° C. for 2 hours in a kneader. The resultant mixture was extruded at a pressure of 100 kg/cm² into blocks measuring 500 mm by 600 mm by 2500 mm (specimen 1). Another mixture, prepared by adding fine particles of metallic silicon to the above materials, equivalent to 5 percent of the total quantity of the calcined anthracite coal and natural graphite, was extruded into blocks of the same size (specimen 2). In the preparation of specimen 2, the quantity of carbon material was reduced by an amount equivalent to the amount of added silicon.

Said specimens 1 and 2 were buried in coke breeze and burned at a temperature of 1300° C., with heated air passed therethrough.

Figure 2:
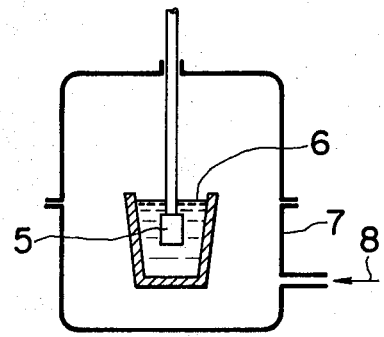
FIG. 2 shows a carbon brick used for attaining the object of this invention being subjected to a molten iron infiltration test.

The specimens 1 and 2 thus burned were subjected to a pressurized molten iron infiltration test as shown in FIG. 2. This test consisted of vacuum degassing a 50 mm cubic specimen 5, immersing the specimen in the molten iron 6, and forcing a gas 8 into a container 7 until a pressure of 5 kg/cm² was developed therein. After the test, the specimen 5 was taken out for cutting and cross-section polishing. The amount of molten iron infiltration was estimated on the basis of the area ratio observed microscopically. The volumetric thermal wearing index was calculated from the external volume loss.

Table 2 lists the measured data on the two specimens.

TABLE 2

Measurements on Specimens 1 and 2

| Description | Specimen 1 (Comparative Example) | Specimen 2 (This Invention) |
|---|---|---|
| Total Porosity (%) | 18.0 | 18.5 |
| Volumetric Ratio of Pores 5 μm and Larger (%) | 10 | 2 |
| Permeability (millidarcy) | 200 | 10 |
| Ratio of Infiltrated Molten Iron after Pressurized Infiltration Test (% by area) | 9 | 1 |
| Volumetric Thermal Wearing Index after Pressurized Infiltration Test | 100 | 80 |

As is evident from Table 2, the two specimens exhibited substantially equal total porosities. But the volumetric ratio of pores 5 μm and larger was much lower in specimen 2 than in specimen 1, as evidenced by the ratio of infiltrated molten iron determined by the pressurized infiltration test.

The reduced molten iron infiltration decreases the cause of thermal wearing that occurs during a long period of service. This improves the durability of carbon bricks against molten iron.

With the internal surface built of large carbon bricks having pores reduced in size by forming an Si—N—O composition therein, the blast furnace hearth accoridng to this invention can remarkably check the infiltration of molten iron, a main cause of thermal wearing, and prolong the service life of the hearth refractory layer.

What is claimed is:

1. A blast furnace hearth for melting iron comprising carbon bricks at least in the internal surface layer of said blast furnace hearth, said bricks consisting essentially of a carbonaceous material, a carbonaceous binder and (1) a Si—N—O composition interspersed throughout the bricks consisting essentially of fibrous fine grained crystals of $Si_2ON_2$ present in such quantities as to fractionize the pores and fill part of the discontinuous pore openings in the brick, thereby reducing the pore size of the bricks to less than 5 μm, and (2) said bricks also containing SiC therein in amounts sufficient to inhibit the formation of cracks due to heat contraction.

2. A blast furnace hearth comprising, at least in the internal surface layer hereof, carbon brick having internal pores reduced in size by developing an Si—O—N compound therein which is prepared by kneading together and forming into brick shape 75 to 85 parts of carbonaceous particles, 0.5 to 15 parts of metallic silicon particles, and 15 to 25 part of carbonaceous binder, burying the formed product in coke breeze, and baking the product at a temperature between 1150° C. and 1500° C. by passing heated air therethrough.

3. A blast furnace according to claim 2 in which the pore size of the brick is not larger than 5 μm.

4. A blast furnace hearth according to claim 1 or 2, wherein the thickness of the internal surface layer built of said carbon bricks is between one-third and one-half of the total hearth thickness.

* * * * *